United States Patent [19]

Brown

[11] Patent Number: 4,662,209

[45] Date of Patent: May 5, 1987

[54] COURSE LENGTH MEASUREMENT

[75] Inventor: Robert L. Brown, 5245 Somerset St., Buena Park, Calif. 90621

[73] Assignee: Robert L. Brown, Buena Park, Calif.

[21] Appl. No.: 827,357

[22] Filed: Feb. 7, 1986

[51] Int. Cl.⁴ ............................................. E21B 47/00
[52] U.S. Cl. ...................................... 73/1 D; 73/1 J; 73/151; 364/422; 364/571; 364/562
[58] Field of Search ................. 73/1 D, 151, 1 J, 1 R; 364/422, 561, 571, 562

[56] References Cited

U.S. PATENT DOCUMENTS

| | | | |
|---|---|---|---|
| 2,655,633 | 10/1953 | Minor et al. | 324/34 |
| 2,970,666 | 2/1961 | Smith | 73/1 R |
| 3,163,487 | 12/1964 | Buck | 346/33 |
| 3,490,149 | 1/1970 | Bowers | 33/133 |
| 3,490,150 | 1/1970 | Whitfill, Jr. | 33/133 |
| 3,789,292 | 1/1974 | Bottoms | 324/34 R |
| 4,399,692 | 8/1983 | Hulsing, II et al. | 73/151 |
| 4,470,124 | 9/1984 | Tagani et al. | 73/1 D X |
| 4,542,647 | 9/1985 | Molnar | 73/151 |
| 4,545,242 | 10/1985 | Chan | 73/152 |

OTHER PUBLICATIONS

L. A. Allaud and J. Ringot, "High Resolution Dipmeter Tool", *The Log Analyst*, May–Jun. 1969, pp. 3–11.

Primary Examiner—Stewart J. Levy
Assistant Examiner—Tom Noland
Attorney, Agent, or Firm—Klein & Szekeres

[57] ABSTRACT

A system for measuring the course length of a well bore uses a probe containing accelerometers to generate a first output signal indicative of the time rate of change of the probe's velocity as it travels through the bore. The probe also contains two casing collar locators separated by a measured distance. A microcomputer in the probe integrates the first output signal twice with respect to time to generate a course length value indicating the total distance travelled by the probe. The microcomputer also calculates a computed distance value by integrating the first output signal twice with respect to time over the time interval between the generation of first and second joint-indicative signals as a result of the successive passage of one pipe joint by the two casing collar locators. The computed distance value is compared by the microcomputer with a stored distance value representing the measured distance between the casing collar locators. From this comparison, a distance error signal is generated and applied as a correction factor to the course length value. In addition, a first acceleration value is calculated using the computed distance value and the joint-indicative signal time interval, and a second acceleration value is calculated using the stored distance value and the same time interval. The first and second acceleration values are compared to yield an acceleration error signal which is applied to the accelerometers for real-time recalibration.

30 Claims, 5 Drawing Figures

COURSE LENGTH MEASUREMENT

BACKGROUND OF THE INVENTION

1. Field of the Invention. This invention relates broadly to the field of well-logging, and more particularly to the field of measuring the course length of a drilled well bore. Specifically, this invention relates to that class of instruments and methods for measuring course length that employs a probe containing accelerometers that yield a signal indicative of the time rate of change of velocity of the probe as it is run through the well bore. This signal is then processed to yield a signal representing the distance traveled by the probe.

2. Brief Description of the Prior Art. Accurate course length measurement is a basic requirement for the accurate survey of a well bore, assuring, for example, entry of the bore into the desired geologic formation. The course length of a well bore is the distance from the surface to the bottom of the bore along the bore's length. If the well bore is entirely vertical, the course length is essentially the same as the vertical depth. In many, if not most, cases, however, a substantial portion of the well bore is drilled at an angle from true vertical, a technique known as "slant" or "directional" drilling. In such cases, the course length of the bore will be greater than its vertical depth.

A conventional technique for measuring course length uses a cable that is run through the bore. A wheel is turned by the cable as it is lowered, and the rotations of the wheel are counted. The distance traveled by the cable down the bore is calculated by multiplying the number of rotations of the wheel by its known circumference. This method yields a low degree of accuracy, due to slippage between the cable and the wheel, and stretching of the cable as a result of its own weight.

Limitations inherent in the cable method led to the development of well bore probes that employ an accelerometer that produces a signal which is integrated twice to yield a value indicative of distance. One accelerometric method, for example, employs an accelerometer that is maintained in a vertical orientation, by gyrometric means, as the probe is lowered. Another method employs three accelerometers oriented along three orthogonal axes.

In U.S. Pat. No. 4,545,242 to Chan, for example, a basic course length value is derived from cable length sensing means, with an accelerometrically-derived signal used as a correction factor.

With these accelerometric methods (and their several variations), it is necessary to correct for gravitational effects. Gravitational forces generate perturbation effects on the acceleration measurement along all three axes due to the inclination of the bore, and due to the effects of the geologic formations between the bore and the surface. Thus, the magnitude of the gravitational effect on the acceleration measurement may change as a function of depth and geologic formation, and the direction of the effect on an accelerometer may change as a function of bore inclination. By maintaining the accelerometer vertical, or by using three orthogonally-oriented accelerometers, these gravitational factors can be offset to a significant extent.

Nevertheless, additional sources of error in the acceleration measurement exist which can diminish the accuracy of the distance measurement. For example, since the magnitude of the gravitational forces on the accelerometric means changes with depth, the accelerometer probe must be stopped periodically for recalibration of its "zero" reading. In other words, the correction factor for the force of gravity must be periodically updated as the magnitude of that factor changes, so that a true reading of dv/dt is obtained. This necessitates bringing the probe to an absolute stop, since any residual motion can impart an erroneous "zero" reading. Not only is stopping the probe time consuming, it is also a tricky feat, mechanically. Yet, the need to obtain an accurate "zero" is great, since error in the accelerometer signal can result in accumulated error in the distance measurement.

Thus, there is a need, as yet unsatisfied, to achieve accurate accelerometric measurement of course length without the need to stop the probe periodically for recalibration. In other words, "real time" recalibration is desired. Furthermore, enhanced overall accuracy, as compared to current techniques, is also sought.

SUMMARY OF THE INVENTION

Broadly, the present invention is a method and apparatus for measuring the course length of a well bore, using an accelerometer probe containing a pair of casing collar locator devices separated by a precisely measured portion of the probe's length. The casing collar locator devices (CCLs) are employed so as to generate a distance error signal that is used periodically both to correct the course length measurement derived from the accelerometric means within the probe, and to recalibrate the accelerometric means in real time; that is, without stopping the descent (or ascent) of the probe.

More specifically, in a preferred embodiment of the invention, the probe that contains the accelerometric distance-measuring apparatus comprises a housing in the form of an elongated, substantially cylindrical tube of non-magnetic metal. A first CCL is located in the distal (lower) end of the housing, and a second CCL is located in the proximal (upper) end of the housing. The two CCLs are separated by a precisely-measured distance. This measured distance (referred to as the "tool length") is substantially less than the spacing between the collars used to join the sections of the casing in the bore. The probe is lowered into the bore by a cable. As the probe is lowered, the accelerometric means within it produce a gravity-corrected (dv/dt, or $\dot{v}$) of the probe as it descends. This $\dot{v}$ signal is fed into an on-board microcomputer, where it is integrated twice to yield an output signal indicative of the distance traveled by the probe.

Also, as the probe is lowered, the first, or distal, CCL is activated by appropriate circuitry until it transmits its representative signal indicating the proximity of a pipe joint or casing collar. At this point, the circuitry deactivates the first CCL and activates the second or proximal CCL until the representative signal is received indicating that the latter CCL has reached the proximity of the same joint or collar. The CCL signals are fed into the microcomputer which, based on the accelerometer signals received in the time interval between the two CCL signals, calculates a value representing the computed distance between the two CCLs. This computed distance value (the computed "tool length") is compared with a value, stored in the microcomputer's memory, representing the measured tool length. The difference between the computed value and the stored measured value is represented by a distance error signal that is employed as a correction to the course length measurement derived from the accelerometric means.

In addition, the distance error signal is further processed by the microcomputer, along with a value representing the time elapsed between the two CCL signals, to yield a digital acceleration error signal. This digital signal is converted to an analog signal, by conventional means, and then fed into appropriate circuitry by which it is used to recalibrate the "zero" of the accelerometric means.

By employing the distance error signal derived from the two CCL signals, the accelerometric means can be recalibrated every time a joint or collar is passed by the probe (approximately every 30 to 40 feet for a typical casing). Thus, recalibration is accomplished in "real time", that is, while the probe is moving and performing the distance measurement. This is in contrast to existing techniques, which require bringing the probe to an absolute standstill at frequent intervals, on the order of one minute, a time-consuming and mechanically difficult exercise.

Moreover, an added benefit is derived from the use of the stored tool length value as a reference value to derive, in essence, a feedback signal to correct the accumulated distance (course length) measurement.

Thus, it will be appreciated that the present invention provides enhanced accuracy for the course length measurement in two ways: (1) by providing a distance error signal derived from a fixed reference value; and (2) by providing frequent and accurate recalibration of the accelerometric mechanism. Moreover, not only is greater accuracy obtained, but the measurement can be made much more quickly, and, therefore, more economically than has been possible with prior art techniques. These and other advantages will be explained more fully in the detailed description which follows.

DETAILED DESCRIPTION OF A PREFERRED EMBODIMENT

Figures 1, 2:
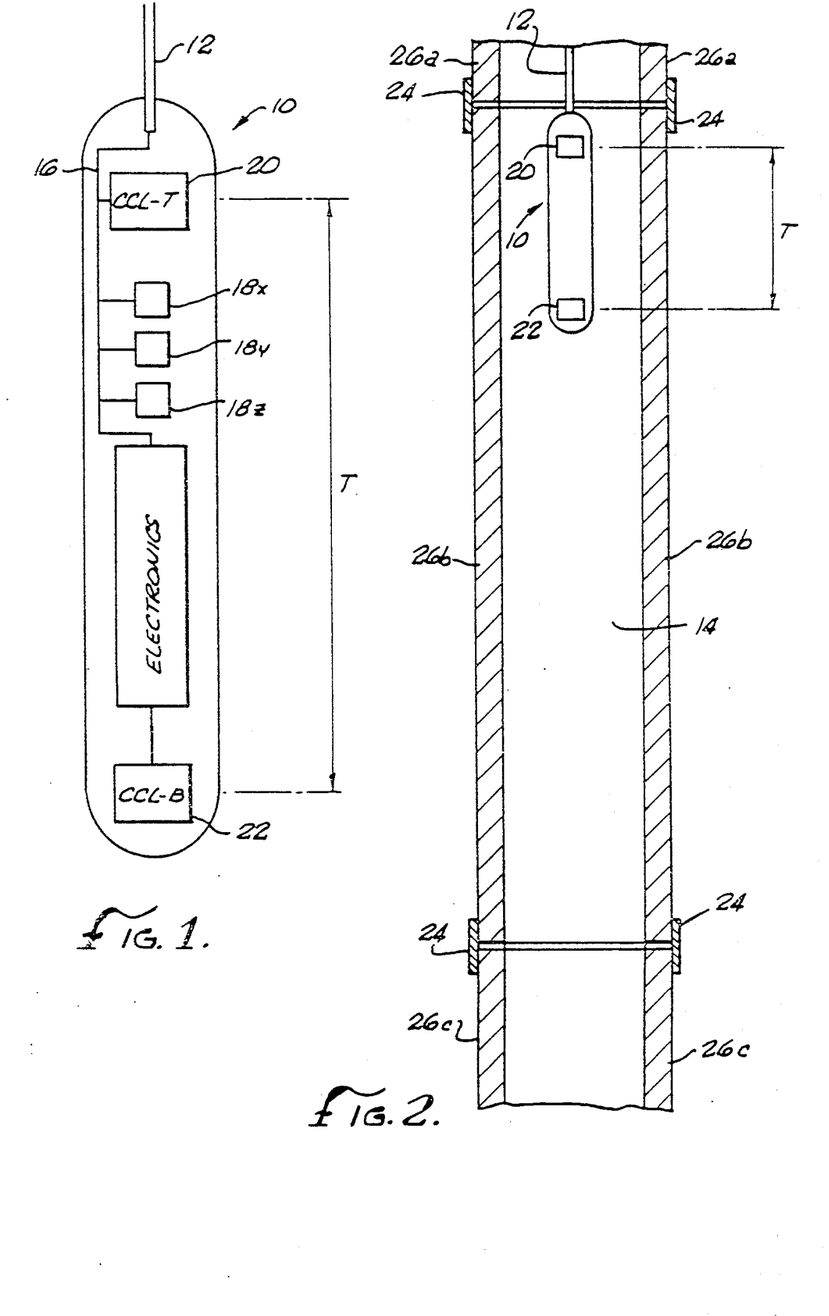
FIG. 1 is a schematic representation of the probe or tool used in the present invention.
FIG. 2 is a diagramatic representation of the tool of FIG. 1 within a cased well bore.

Referring first to FIGS. 1 and 2, the apparatus used in carrying out the present invention is housed in a probe or tool 10. The tool 10 typically includes a hollow, tubular housing, made of a non-magnetic metal. The tool 10 has a top or proximal end attached to a cable 12, and a distal or bottom end. The cable 12 extends to surface equipment and apparatus (not shown) which is used to raise and lower the tube within a well bore 14 (FIG. 2). The cable 12 also carries electrical wiring 16 (shown schematically in FIG. 1) that carries signals from the circuitry within the tool 10 to receiving equipment (not shown) on the surface, as will be described below. The probe 10 typically also contains other types of sensors (not shown) commonly used in the well-logging field.

Contained within the tool 10 are three closely-matched accelerometers $18_x$, $18_y$, and $18_z$, shown schematically in FIG. 1. The accelerometers $18_x$, $18_y$, and $18_z$ are advantageously of the force-balance type, in which the displacement of a magnetic mass is sensed, and a magnetic coil is energized to return the mass to its original position. The magnetic force needed to balance the force due to acceleration in the sensed direction is measured to yield a signal indicative of that acceleration. Such accelerometers are well-known in the art, and are commercially available.

The accelerometer $18_z$ is mounted in the tool 10 so as to measure acceleration along the longitudinal axis of the tool, which is defined as the z-axis. The z-axis of the tool 10 may deviate to varying degrees from true vertical as the tool moves through the well bore 14, since the bore itself may undergo changes in inclination from true vertical throughout its length. The accelerometers $18_x$ and $18_y$ are mounted so as to measure acceleration in directions that are mutually orthogonal to the z-axis and to each other. For purposes of the discussion which follows, the output signal values of the accelerometers $18_x$, $18_y$, and $18_z$ will be labelled $G_x$, $G_y$, and $G_z$, respectively, representing gravitational acceleration in the x, y, and z directions, respectively.

Mounted near the top or proximal end of the tool 10 is a proximal or top casing collar locator (CCL) 20. A distal or bottom casing collar locator 22 is located near the bottom or distal end of the tool 10. The CCLs 20 and 22 may be of any type well-known in the art. See, for example, U.S. Pat. No. 3,163,487 to Buck. The purpose of the CCLs 20 and 22 is to detect, as they are passed by the probe, the proximity of pipe joints. If the bore is cased, casing collars 24 (FIG. 2) are used at the joints to join adjacent casing pipe segments, such as those designated by the numerals 26a, 26b, and 26c in FIG. 2. The CCLs 20 and 22 are sensitive to the magnetic properties of the adjacent pipe material, and can therefore distinguish the pipe joints on the basis of their different magnetic properties. A signal is thus generated that has a distinctive value when the CCL is passing a collar 24 in a cased bore, or a joint between adjacent drill pipe segments. The CCLs 20 and 22 are separated by a precisely measured distance T, referred to as the "tool length", which is advantageously less than half the distance between successive collars 24. For example, where the distance between the collars 24 averages about 30 to 40 feet (9 to 12 meters), the distance T is advantageously about 10 feet (3 meters). The tool 10 also contains the electronic circuitry which processes the signals from the CCLs and the accelerometers, and transmits output signals to the surface receiving equipment, as will be described below. The application of the CCLs 20 and 22 in the present invention requires their operational characteristics to be closely matched, as will be appreciated from the ensuing discussion.

Figure 3:
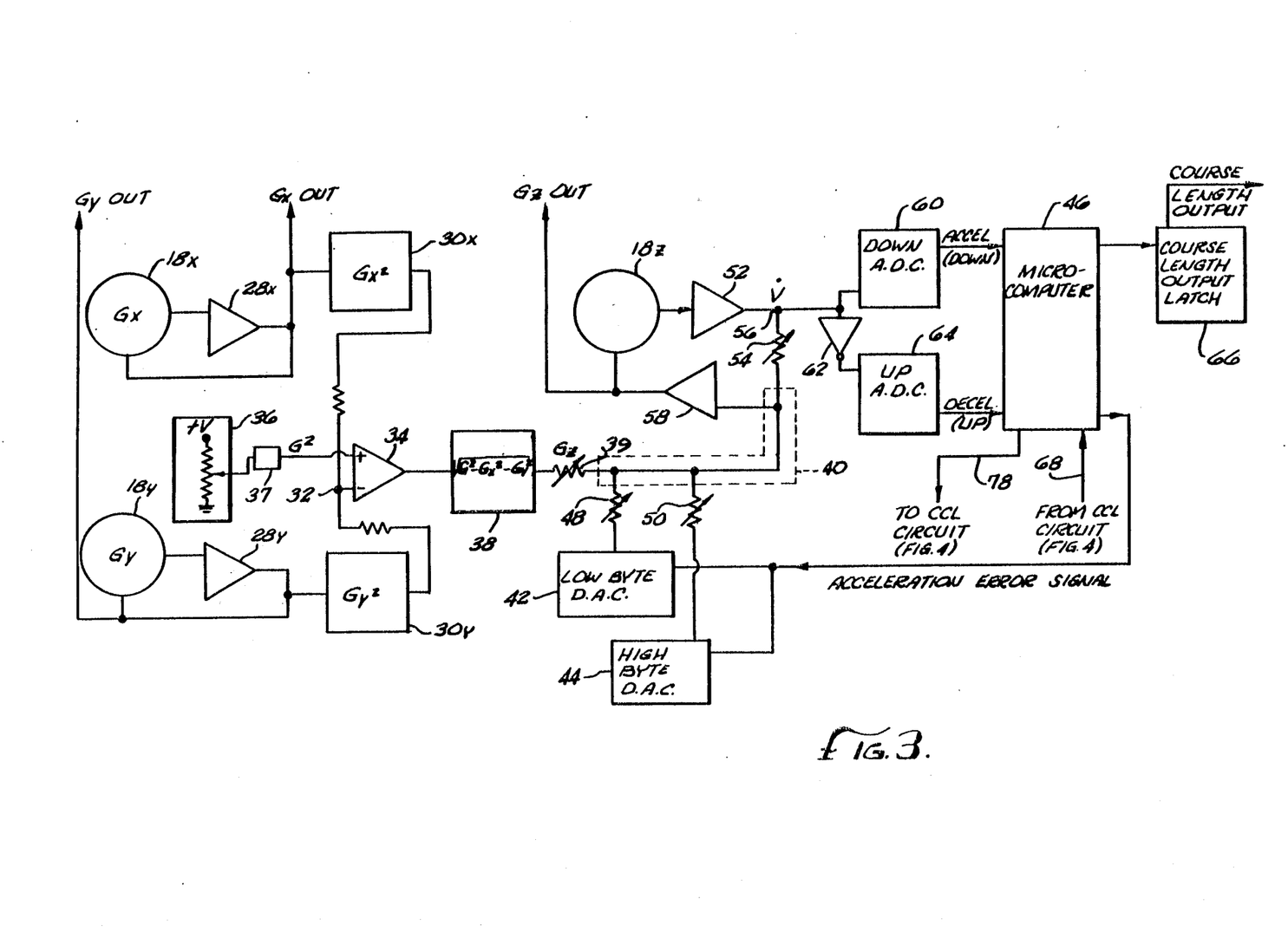
FIGS. 3, 4, and 5 are schematic representations of the electronic circuitry and associated electromechanical components employed in a preferred embodiment of the present invention.

FIG. 3 illustrates schematically the electronic and electromechanical system used in a preferred embodiment of the present invention. As mentioned above, three orthogonal accelerometers $18_x$, $18_y$, and $18_z$ are employed in the invention. The use of three accelerometers allows the system to correct for gravitational effects, thereby yielding an accelerometric signal which is purely representative of the change in the tool's velocity with respect to time, i.e., $dv/dt$ or $\dot{v}$.

Specifically, the force sensed by an accelerometer in a bore-hole environment is the sum of motion-induced, or "true" acceleration ($\dot{v}$) and the accelerometer effects of gravitational forces. (Other error terms, such as null offsets and scale factor variations, may be present, but they can be ignored for the purposes of this discussion.) The dominant force under most conditions will be the gravitational force, which will be linear with the cosine of the tool's inclination from vertical. Since the course length measurement which is to be made is a function of the double integration of the motion-induced acceleration ($\dot{v}$) only, it can readily be seen that the gravitational term in the total acceleration must be removed.

To this end, the gravitational acceleration signals $G_x$ and $G_y$ from the accelerometers $18_x$ and $18_y$, respectively, are entered into an analog computation circuit after suitable amplification by operational amplifiers $28_x$ and $28_y$. (The $G_x$ and $G_y$ signals may also be used as independent outputs to feed into other circuitry in the probe which may require these values for other computations.) The computation circuit comprises a squaring circuit $30_x$ for the $G_x$ signal and a similar squaring circuit $30_y$ for the $G_y$ signal. The squaring circuits $30_x$ and $30_y$ may be of conventional design, utilizing any of a variety of integrated circuits, such as, for example, the Model AD533 manufactured by Analog Devices Corporation of Norwood, Mass.

The output signals from the squaring circuits $30_x$ and $30_y$, added at a summing junction 32, provide the negative input to a linear summing amplifier 34. The positive input to the amplifier 34 is provided by a voltage representing the square of the gravitational acceleration constant ($G^2$), derived from an adjustable voltage source 36. The $G^2$ voltage is obtained by adjusting the voltage source 36 until a voltage is found that yields a reading of 1 G (9.8 m/sec$^2$) for each of the 3 accelerometers, and then squaring the resultant voltage by conventional electronic means, such as a squaring circuit 37. The output signal of the summing amplifier 34 thus has a value representing the quantity $$G^2 - G_x^2 - G_y^2 = G_z^2.$$

This signal representing $G_z^2$ is then fed into a square-rooting circuit 38, to obtain a signal having a value representing $G_z$, the gravitational acceleration component along the z-axis. The square-rooting circuit 38 may be of any conventional design, and can utilize an integrated circuit, such as the previously-mentioned Analog Devices Model AD533. The $G_z$ signal is then inputted, through a balancing resistor 39 (preferably a trimmer resistor), to a summing point 40, along with a two-component acceleration error signal received from first and second digital-to-analog converters 42 and 44. As will be discussed further below, the digital-to-analog converters 42 and 44 receive a digital acceleration error signal from a microcomputer 46 and convert it to an analog acceleration error signal. The digital signal is a 16-bit signal, and the first digital-to-analog converter 42 operates only on the lower 8 bits, or the "low byte" of the digital signal. Likewise, the second digital-to-analog converter 44 operates only on the upper 8 bits, or the "high byte". Acceptable alternatives to this arrangement may readily suggest themselves. The digital-to-analog converters 42 and 44 may be Analog Devices Model AD5587 integrated circuit devices, or their equivalents. Their output voltages may advantageously be balanced by resistors 48 and 50, which are preferably the adjustable or "trimmer" type.

Also fed into the summing point 40 is an output voltage signal from a linear amplifier 52, dropped through a balancing resistor 54, preferably a trimmer resistor. The linear amplifier 52 receives its input from the z-axis accelerometer $18_z$, and its output voltage (at point 56) has a value representing the rate of change of velocity ($\dot{v}$) along the z-axis (as defined above), plus changes (if any) in the acceleration error signal value in the time interval in which the tool 10 passes two successive collars 24. Careful control over the descent or ascent of the tool can keep the rate of change in the error signal value small, so that the voltage at the point 56 may be considered, for the purposes of this invention, to be representative only of $\dot{v}$.

The four voltage signals summed at the summing junction 40 are then fed into a summing amplifier 58, the output of which is a force-balancing signal supplied to the coil of the z-axis accelerometer $18_z$ to restore that accelerometer to its null position. (This force-balancing signal may also be outputted, as a corrected $G_z$ signal, to other probe circuitry that can use this value for other calculations and measurements.)

It will be appreciated that if the four voltage signals summed at the summing junction 40 are properly balanced (by equalizing the resistances of the balancing resistors 39, 48, 50, and 54, for example), the $G_z$ component of this summed voltage applied to the z-axis accelerometer $18_z$ will negate or nullify the gravitational component of the acceleration measured by that accelerometer, so that the acceleration measured by the z-axis accelerometer $18_z$ and outputted to the point 56 is purely motion-induced, i.e., $\dot{v}$. The analog acceleration error signal component of the summed voltage is applied to the accelerometer coil for recalibration purposes, as will be discussed below.

The $\dot{v}$ signal at the point 56 is, of course, an analog signal, which must be converted to a digital signal before it can be fed into the microcomputer 46 for the processing which will be explained below. To this end, the $\dot{v}$ signal is fed into a first analog-to-digital converter 60, and, through an inverting amplifier 62, to a second analog-to-digital converter 64. The first analog-to-digital converter 60 produces a non-zero digital signal having a value representative of $\dot{v}$ only when $\dot{v}$ is positive, that is, when the tool is going down the hole. The second digital-to-analog converter 64, receiving an inverted analog only when $\dot{v}$ is negative, that is, when the tool is moving up the hole. The analog-to-digital converters 60 and 64 may be of conventional design, utilizing an integrated circuit such as the Analog Devices Model AD574 or the equivalent.

The output signals from the analog-to-digital converters 60 and 64 are fed into the microcomputer 46. The microcomputer 46 is advantageously of the integrated-circuit type, including an 8-bit microprocessor and sufficient storage (both RAM and ROM) to store the operational software and the necessary data. Several models of the microcomputers marketed under the Z8 trademark by Zilog, Inc., of Campbell, Calif. have been found suitable for this invention. It is within the ordinary skill in the pertinent arts to select equivalent microcomputers and adapt them to the present invention.

The storage of the microcomputer includes, as mentioned above, random access memory (RAM) that is functionally divided into a number of registers. One of these registers is designated the Velocity Register, or Register V. Register V is incremented, at fixed frequent time intervals ($\delta t$) of approximately 100 microseconds ($10^{-4}$ seconds), with a value corresponding to $\dot{v}_n \delta t$, where $\dot{v}_n$ is the acceleration ($\dot{v}$) value received from one of the analog-to-digital converters 60 and 64 (depending upon the direction of tool movement) during the $n^{th}$ time interval. Thus, Register V is continuously being updated, every 100 microseconds, with an instantaneous acceleration value, so that Register V effectively integrates $\dot{v}$ with respect to time through the $n^{th}$ time interval to yield an instantaneous velocity value $V_n$.

Also, at each interval $\delta t$, the velocity value from Register V is used to increment two distance registers with a value corresponding to $V_n \delta t$. The first of these distance registers, which may be designated Register A, is initially set to zero, and effectively integrates the velocity over a time span beginning at the start of the survey and ending at the current ($n^{th}$) time interval. Thus, Register A carries an instantaneous value for the total distance traveled by the tool, i.e., the course length. This course length value is stored in a buffer memory or course length output latch 66 for transmission to the surface instrumentation (not shown).

The second distance register, which may be designated Register B, is set to zero by the first of the two signals from CCLs 20 and 22 (depending upon the direction of tool travel) received from a CCL circuit (FIG. 4) along line 68, as the CCLs pass each collar 24. Register B stops incrementing when the second of the two CCL signals is received for each collar. Thus, Register B effectively integrates velocity with respect to time over the time span required for each collar 24 to be passed by both CCLs. The result is a calculated "tool length" value for the separation between the CCLs 20 and 22. This calculated tool length value is then compared by the microcomputer 46 to the measured tool length value T, which is stored in a ROM in the microcomputer. If this comparison reveals a discrepancy between the calculated and measured tool length values, a distance error signal is generated with a distance error value that is indicative of the amount of the discrepancy. This distance error value is added to, or subtracted from, the total course length value in Register A, as appropriate, to provide a corrected course length value in Register A each time a collar is passed by both CCLs.

The distance error signal, along with a value representing the time elapsed between the two CCL signals received for each collar, is processed by the microcomputer to yield a value for an acceleration error experienced during that time interval. Specifically, the acceleration error value is calculated from the difference between a first acceleration value derived from the stored, measured tool length value, and a second acceleration value derived from the computed tool length, both the first and second acceleration values being calculated on the basis of the time elapsed between the two CCL signals for each collar, according to the formula: $\Delta a = 2(s_m - s_c)\Delta t^2$; where $\Delta a$ is the acceleration error value, $s_m$ is the measured tool length value, $s_c$ is the calculated tool length value, and $\Delta t$ is the time interval between the two CCL signals. The accelerometer error value is then added to, or subtracted from, an acceleration register in the microcomputer's RAM, and this updated or corrected acceleration register, in turn, is used to generate a digital acceleration error signal which is converted to an analog acceleration error signal by the digital-to-analog converters 42 and 44. The analog acceleration error signal is then transmitted to the summing junction 40, where it is added to the $\dot{v}$ signal from the point 56 and the $G_z$ signal from the square-rooting circuit 38, as previously described, for application to the coil of the z-axis accelerometer $18_z$.

In this manner, the acceleration error signal, generated every time a casing collar is passed by both CCLs, is applied to the z-axis accelerometer as a corrective signal for recalibrating that accelerometer at frequent intervals. Most importantly, this recalibration occurs in real time, while the tool is moving, thereby avoiding the problems attendant to stopping the tool for recalibration.

As mentioned above, the microcomputer 46 receives signals from the CCLs 20 and 22 as they pass each collar 24. These signals are received from a CCL detector circuit, shown in FIG. 4, along the line 68. The CCL detector circuit shown in FIG. 4 is used to selectably actuate and deactuate the CCLs 20 and 22 at the appropriate times, and to assure that the signal produced in response to the detection of a collar is recognized over the background.

Figure 4:
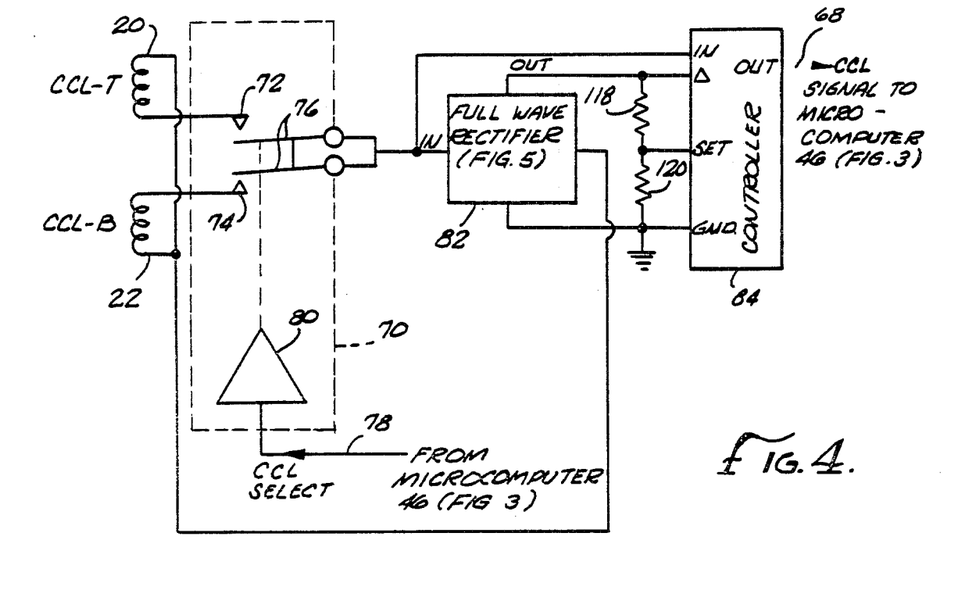

To understand the need for a circuit such as that shown in FIG. 4, it is helpful to understand, in broad outline, the function of a typical casing collar locator. As previously mentioned, devices of this type are sensitive to the magnetic properties of the surrounding environment, i.e., the adjacent casing material. A signal is generated in a wave form similar to a sine wave, varying in amplitude. A large amplitude variation in a relatively short time interval indicates the presence of a collar, and this amplitude variation is detected by suitable electronic means. A problem can arise, however, where the background signal from the casing pipe is relatively high. In such cases, it may be difficult to detect a joint- or collar-indicative signal. Usually, this problem is handled by a manual adjustment of gain control circuitry at the instrument panel on the surface. In the present invention, however, the CCL signals are not sent directly to the surface. Instead, these signals are utilized by the instrumentation within the tool. Therefore, it is necessary to provide a circuit which will recognize the background signal level and distinguish the collar-indicative signal from this background signal. There are a number of automatic gain control circuits that will perform this function. Nevertheless, the circuit of FIGS. 4 and 5, to be described shortly, is preferred, in that it uses the background signal to set a threshold over which the collar-indicative signal can be sensed. This manner of operation allows a serious anomaly in the casing pipe itself to be treated as an 'apparent' collar, so that a rare occurrence of such an anomaly will not create errors in the overall depth measurement.

With reference now to FIG. 4, the top CCL 20 and the bottom CCL 22 are indicated schematically as coils. The CCLs 20 and 22 are selectably actuated by a single pole, double throw switch 70. The switch 70 is actually an integrated circuit, such as a GE Intersil Model DGM188. The top CCL 20 is connected to a first fixed switch contact 72, while the bottom CCL 22 is connected to a second fixed switch contact 74. The switch 70 has a movable contact 76 that is switched between the fixed contacts 72 and 74 in response to a CCL selection signal received on a switch input line 78 from the microcomputer 46. The integrated circuit switch 70 advantageously includes a linear amplifier 80 for amplifying the CCL selection signal before it is applied to the movable contact 76. The microcomputer 46 generates an appropriate CCL selection signal to select either the top or bottom CCL to be activated at the appropriate time, as will be discussed below.

The common output of the switch 70 is connected to the input of a full-wave rectifier 82, and also to the input of a hybrid integrated circuit "bang-bang" controller 84, such as that marketed by Linear Technology Corp., of Milpitas, Calif., as Model No. LTC1041.

The full-wave rectifier 82 has an inherent dead band equal to the forward voltage drops of its component diodes. This dead band may be eliminated by using a full wave rectifier circuit similar to the one illustrated in FIG. 5, which includes an averaging filter. The operation of the circuit shown in FIG. 5 may be best understood by following the signal path first for negative input signals, and then for positive input signals. When the AC input is negative, the output of a first amplifier 90 is clamped to approximately 0.7 volts positive, which is the forward voltage drop of a first diode 92 connected across the first amplifier 90. At the same time, the output of the first amplifier 90 is disconnected from the input of a second amplifier 94 by a second diode 96. The second amplifier 94 then functions as a unity-gain inverter with an input resistor 98 and a feedback resistor 100 giving a positive-going output. (As shown, the feedback resistor 100 preferably comprises a relatively large fixed feedback resistor 102 in series with a relatively small adjustable, or trimmer resistor 104, to allow calibration.)

Figure 5:
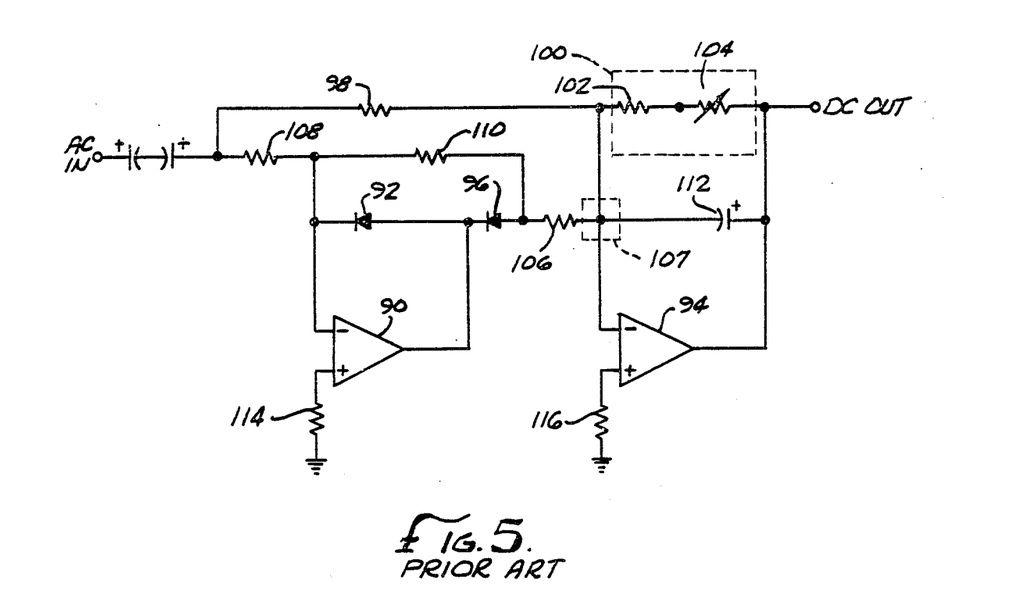

When the AC input is positive, the first amplifier 90 operates as a normal amplifier connected to the input of the second amplifier 94 through a resistor 106 and a summing point 107. The first amplifier then acts as a unity-gain inverter, with an input resistor 108 and a feedback resistor 110. (The gain accuracy of the first amplifier 90 is not affected by the second diode 96, since the latter is inside the feedback loop of the former.) Positive current is then fed into the input summing point 107 of the second amplifier 94 through the input resistor 98, while negative current is drawn from the summing point 107 through the resistor 106. Since the voltages across the resistors 98 and 106 are equal and opposite, if the resistor 106 is half the value of the input resistor 98, the net input current at the summing point 107 will be equal to and opposite from the current through the input resistor 98. The second amplifier 94 then operates as a summing inverter with unity gain, again giving a positive output.

With a capacitor 112 connected across the second amplifier's feedback resistance 100, an averaging filter function is provided. The second amplifier 94 then operates in a manner similar to a low pass filter. The time constant provided by the resistance 100 and the capacitor 112 should be chosen to be much greater than the maximum period of the input voltage to be averaged.

As will be apparent to those skilled in the pertinent arts, the amplifiers 90 and 94 must be compensated for unity-gain operation. The positive inputs of the amplifiers 90 and 94 must be grounded through resistors 114 and 116, respectively, chosen to minimize output errors due to input offset current.

The full-wave rectifier circuit described above and illustrated in FIG. 5 is of a type well-known to those skilled in the pertinent arts. An example of such a circuit, for instance, can be found in the *Linear Applications Handbook*, published by National Semiconductor Corporation, at pages AN20-8 and AN20-9 (1978 edition). functionally equivalent substitutes will suggest themselves. This specific circuit is disclosed as exemplary only, and to the skilled practitioner.

The output of the full-wave rectifier circuit 82 is connected to the Delta terminal of the controller circuit 84. The Delta terminal signal establishes a "dead band" for the input signal to the controller circuit 84, centered around a "set point" established by a voltage divider comprising resistors 118 and 120 connected in series between the rectifier output and ground. In the preferred embodiment, the averaging filter of the full-wave rectifier circuit 82 establishes a background signal level at the circuit's output, corresponding to the average CCL signal level developed by the movement of CCLs between the collars. This background signal level, in turn, is used to establish the magnitude of the controller circuit dead band on each side of its set point. With its dead band so established, the controller circuit 84 will yield a non-zero output only when the input signal amplitude is at least about twice the amplitude of the rectified and averaged background signal. (This ratio can be changed, if desired, with suitable gain applied in or after the rectifier circuit 82.) Such a large deviation in amplitude from the background level occurs only when a collar is detected, thereby assuring the accurate recognition of a collar-detection signal.

When the controller circuit generates a positive output in response to the detection of a collar, the output signal is transmitted to the microcomputer 46 via the line 68. Normally, the CCL collar-detection signal will be of sufficient duration to assure its capture by the controller circuit 84 and the microcomputer 46. If desired, however, a one-shot circuit (not shown), of conventional design, can be interposed between the controller circuit 84 and the microcomputer 46 to provide a desired pulse length.

If the initial velocity entered into the velocity register of the microcomputer 46 indicates that the tool is moving down the hole (i.e., away from the surface), the bottom CCL 22 is activated by the microcomputer. The first collar detection signal received by the microcomputer then indicates that the bottom CCL 22 is passing the first collar. The microcomputer then zeroes the tool length register (Register B), deactivates the bottom CCL 22, and activates the top CCL 20. When the top CCL 20 then passes the same collar, the microcomputer again receives a collar detection signal. The microcomputer, which has been incrementing Register B, in the manner described above, from the time it had been zeroed, now stops incrementing Register B. The value stored in Register B is now compared to the stored, measured tool length value T, so that the distance error signal and the acceleration error signal can be generated, as discussed above.

If the initial velocity entered into the velocity register of the microcomputer 46 indicates that the tool is moving up the hole (i.e., toward the surface), a similar procedure is performed, except that the top CCL 20 is first activated until the first collar detection signal indicates that the top CCL 20 is passing the first collar. Then, Register B is zeroed, the top CCL 20 is deactivated, and the bottom CCL 22 is activated until it passes the same collar. Thus, the above-described distance error signal and acceleration error signal can be generated, regardless of the direction of tool movement.

Although the algorithm used by the microcomputer 46 has been described above only in broad terms, it is considered to be well within the ability of a person of ordinary skill in the pertinent arts to create any of a variety of specific computer programs that will provide the desired results. Such programs will, of course, vary depending upon the specific microcomputer used, the type and format of the desired output data, the specific electronic circuitry employed, and other factors that relate to the specific needs and desires of the invention's users.

Thus, as described above, there is provided by the present invention a method and apparatus by which the course length of a cased well bore can be measured with an enhanced degree of accuracy, as compared with prior art techniques. Moreover, this enhanced accuracy is achieved in conjunction with greater speed in obtaining the measurement, thereby providing greater economy in the field. These advantages are provided without adding significantly to the mechanical complexity of the tool and its instrumentation, thereby allowing a high degree of reliability to be obtained, while also allowing the invention to be incorporated in well-surveying tools of a wide variety of types.

While a preferred embodiment of the invention has been described above, it will be appreciated that several modifications and variations will suggest themselves to those skilled in the pertinent arts. For example, the electronic circuitry described herein in specific detail is exemplary only, and functionally equivalent circuitry could readily be devised to suit specific applications and needs. Also, the invention can be modified for use with different types of accelerometers. Moreover, although the invention has been described above for use in a cased well bore, in which the CCLs detect the passage of the collars 24, it will be appreciated that CCLs exist which are sensitive to uncollared pipe joints, making the invention suitable for use within a drill pipe string. These and other modifications that may suggest themselves should be considered within the spirit and scope of the invention, as defined in the claims which follow.

What is claimed is:

1. A system for measuring the course length of a well bore, wherein said bore includes a pipe formed from a plurality of segments connected at spaced intervals by a plurality of pipe joints, said system comprising:
   a probe having a hollow elongate body with first and second ends;
   accelerometric means within said probe for generating a first output signal indicative of the rate of change of velocity of said probe as it travels through the pipe;
   first casing collar locating means, disposed within said probe near one end thereof, for generating a first joint-indicative signal in the proximity of one of said pipe joints;
   second casing collar locating means, disposed within said probe near the other end thereof and spaced from said first casing collar locator means by a measured fixed distance, for generating a second joint-indicative signal in the proximity of a pipe joint; and
   computing means, responsive to said first output signal and said first and second joint-indicative signals, for (a) generating a second output signal having a value indicative of the total distance travelled by said probe through said bore, (b) generating a computed distance signal in response to the successive generation of said first and second joint-indicative signals, said computed distance signal having a value representing the computed distance between said first and second casing collar locator means, calculated from the values of said first output signal received in the time interval between the reception of said first and second joint-indicative signals, (c) comparing the computed distance value with a stored distance value representing the measured fixed distance between said first and second casing collar locator means, (d) generating a distance error signal in response to the difference between the stored distance value and the computed distance value, and (e) using said distance error signal to correct the value of said second output signal.

2. The system of claim 1, wherein the measured fixed distance between said first and second casing collar locator means is not more than about one-half the average distance between adjacent pipe joints in said pipe.

3. The system of claim 1, wherein said computing means further comprises recalibration means, responsive to said computed and stored distance values and to the time interval between the generation of said first and second joint-indicative signals, for (a) generating an acceleration error signal having a value representing the difference between a first acceleration value derived from said stored distance value and a second acceleration value derived from said computed distance value, and (b) applying said acceleration error signal to said accelerometer means to recalibrate said accelerometer means in real time.

4. The system of claim 1, wherein said accelerometer means comprises a first accelerometer responsive to acceleration along a first axis, a second accelerometer responsive to acceleration along a second axis orthogonal to said first axis, and a third accelerometer responsive to acceleration along a third axis orthogonal to both of said first and second axes, said third axis being aligned with the longitudinal axis of said probe.

5. The system of claim 4, wherein said apparatus further comprises means for producing a gravitational signal having a value representing the gravitational acceleration constant G, wherein said first accelerometer generates a first accelerometric signal having a value $G_x$, said second accelerometer generates a second accelerometric signal having a value $G_y$, and said third accelerometer generates said first output signal in response to the total acceleration along said third axis, less the gravitational acceleration along said third axis, said gravitational acceleration along said third axis having a value $G_z = (G^2 - G_x^2 - G_y^2)^{\frac{1}{2}}$.

6. The system of claim 5, wherein said apparatus further comprises:
   first electronic means, operative on said first accelerometric signal, for obtaining a value $G_x^2$;
   second electronic means, operative on said second accelerometric signal, for obtaining a value $G_y^2$;
   third electronic means, operating on said gravitational signal, for obtaining a value $G^2$;
   fourth electronic means, responsive to the values $G_x^2$, $G_y^2$, and $G^2$, for obtaining a value $G_z = (G^2 - G_x^2 - G_y^2)^{\frac{1}{2}}$; and
   fifth electronic means for applying the output value of said fourth electronic means to said third accelerometer so as to counteract the gravitational acceleration applied to said third accelerometer along said third axis, whereby the net output of said third accelerometer is said first output signal having a value indicative of the rate of change of the velocity of said probe.

7. The system of claim 6, wherein said computing means comprises acceleration error signal generating means, responsive to said computed and stored distance values and to the time interval between the generation of said first and second joint-indicative signals, for generating an acceleration error signal having a value representing the difference between a first acceleration value derived from said stored distance value and a second acceleration value derived from said computed distance value, and applying said acceleration error signal value to said fifth electronic means for application to said third accelerometer as a corrective factor, whereby said third accelerometer is recalibrated in real time.

8. The system of claim 1, wherein said computing means comprises:

first register means, responsive to said first output signal, for (a) storing the value of said first output signal, (b) incrementing the stored value of said first output signal continuously at periodic time intervals, and thereby (c) integrating said first output signal with respect to time through the current time interval to yield a value representative of the instantaneous velocity of said probe;

second register means, responsive to said instantaneous velocity value received from said first register means, for (a) storing said instantaneous velocity value, (b) incrementing the stored instantaneous velocity value continuously at said periodic time intervals, and thereby (c) integrating said instantaneous velocity value with respect to time through the current time interval to yield said second output signal; and third register means, responsive to said first and second joint-indicative signals and to said instantaneous velocity value received from said first register means, for (a) storing said instantaneous velocity value after first storing a zero value in response to said first joint-indicative signal, (b) incrementing the stored instantaneous velocity value continuously at said periodic time intervals until said second joint-indicative signal is generated, and thereby (c) integrating said instantaneous velocity value with respect to time during the interval between the generation of said first and second joint-indicative signals to yield said computed distance signal.

9. The system of claim 8, further comprising:

actuation means, operatively associated with said computing means, for sequentially (a) actuating said first casing collar locating means until said first joint-indicative signal is generated, (b) deactuating said first casing collar locating means and actuating said second casing collar locating means until said second joint-indicative signal is generated, and (c) deactuating said second casing collar locating means and reactuating said first casing collar locating means in response to said second joint-indicative signal.

10. A method of measuring the course length of a well bore having a pipe comprising a plurality of pipe segments connected at a plurality of spaced-apart pipe joints, said method comprising the steps of:

(a) moving a probe containing accelerometric means through said pipe in said well bore;

(b) obtaining a first output signal from said accelerometric means indicative of the rate of change of the velocity of said probe as it is moved through said pipe;

(c) electronically processing said first output signal to obtain a second output signal having a value indicative of the total distance travelled by said probe;

(d) generating a first joint-indicative signal as each pipe joint is passed by a first casing collar locator disposed near one end of said probe;

(e) generating a second joint-indicative signal as each pipe joint is passed by a second casing collar locator disposed near the other end of said probe and separated from said first casing collar locator by a measured fixed distance;

(f) storing a value indicative of said measured fixed distance;

(g) generating a computed distance signal in response to the successive generation of said first and second joint-indicative signals, said computed distance signal having a value indicative of the computed distance between said first and second casing collar locators, calculated from the values of said first output signal received in the time interval between the generation of said first and second joint-indicative signals;

(h) comparing said stored distance value with said computed distance value and generating a distance error signal in response to the results of the comparison; and (i) applying the value of said distance error signal to the value of said second output signal as a correction factor.

11. The method of Claim 10, further comprising the steps of:

(j) generating an acceleration error signal having a value representing the difference between (i) a first acceleration value derived from said stored distance value and the time interval between the generation of said first and second joint-indicative signals, and (ii) a second acceleration value derived from said computed distance value and the time interval between the generation of said first and second joint-indicative signals; and (k) applying said acceleration error signal value to said accelerometric means to provide a corrective factor to said first output signal.

12. The method of claim 10, wherein said step of obtaining said first output signal comprises the steps of:

(a) measuring the total acceleration along the axis of probe movement due to both gravitational acceleration and motion-induced acceleration; and (b) negating the gravitational acceleration component of the total measured acceleration.

13. The method of claim 10, wherein said accelerometric means comprises first, second, and third accelerometers disposed in said probe to measure acceleration along first, second, and third mutually orthogonal axes, said third axis being defined as the direction of travel of said probe, and wherein said step of obtaining said first output signal comprises the steps of:

(a) generating first and second accelerometer signals respectively indicative of the gravitational acceleration measured by said first and second accelerometers;

(b) generating a gravitational constant signal indicative of the gravitational acceleration constant;

(c) electronically processing said first and second accelerometer signals and said gravitational constant signal to yield a gravitational acceleration signal having a value indicative of the gravitational acceleration along said third axis; and (d) applying said gravitational acceleration signal to said third accelerometer so as to negate the gravitational acceleration component of the total acceleration experienced by said third accelerometer, whereby said third accelerometer provides said first output signal having a value substantially indicative of only the motion-induced acceleration experienced by said third accelerometer.

14. The method of claim 13, wherein said first accelerometer signal has a value $G_x$, said second accelerometer signal has a value $G_y$, said gravitational constant signal has a value G, and said gravitational acceleration signal has a value $G_z$, and wherein said step of electronically processing said first and second accelerometer signals comprises the steps of:
   (a) processing said first and second accelerometer signals to obtain values $G_x^2$ and $G_y^2$, respectively;
   (b) processing said gravitational constant signal to obtain a value $G^2$; and
   (c) electronically calculating said value $G_z$ according to the equation $G_z=(G^2-G_x^2-G_y^2)^{\frac{1}{2}}$.

15. The method of claim 10, wherein said step of electronically processing said first output signal comprises the steps of:
   (a) storing the value of said first output signal;
   (b) incrementing the stored value of said first output signal continuously at periodic time intervals, thereby integrating said first output signal with respect to time through the current time interval to yield a stored value representing the instantaneous velocity of said probe; and
   (c) incrementing the stored instantaneous velocity value continuously at said periodic time intervals with an updated instantaneous velocity value, thereby integrating said instantaneous velocity value with respect to time through the current time interval to yield said second output signal.

16. The method of claim 15, wherein said step of generating a computed distance signal comprises the steps of:
   (a) zeroing a computer memory register in response to said first joint-indicative signal;
   (b) storing said instantaneous velocity value in said register; and
   (c) incrementing said stored instantaneous velocity value continuously at said periodic time intervals until said second joint-indicative signal is generated, thereby integrating said instantaneous velocity value with respect to time during the interval between the generation of said first and second joint-indicative signals to yield said computed distance signal.

17. The method of claim 10, wherein said step of generating a computed distance signal comprises the steps of:
   (a) actuating said first casing collar locator until said first joint-indicative signal is generated;
   (b) zeroing a computer memory register in response to said first joint-indicative signal;
   (c) deactuating said first casing collar locator and actuating said second casing collar locator in response to said first joint-indicative signal;
   (d) integrating said first output signal twice with respect to time through a current time interval, and storing the integrated value through the current time interval in said register;
   (e) deactuating said second casing collar locator and re-actuating said first casing collar locator in response to said second joint-indicative signal; and
   (f) using the integrated value contained in said register at the time said second joint-indicative signal is generated as said computed distance signal value.

18. Apparatus for measuring the course length of a well bore, wherein said bore includes a pipe formed from a plurality of pipe segments joined at spaced intervals by a pipe joint at each of said intervals, said apparatus comprising:
   a probe having a hollow, elongate body defining a longitudinal axis, said body having first and second ends;
   means for moving said probe in said pipe selectively either toward or away from the earth's surface;
   accelerometric means in said probe for generating a first output signal having a value indicative of the rate of change of the velocity of said probe as said probe is moved through said pipe;
   first casing collar locator means, disposed within said probe near said first end thereof, for generating a first joint-indicative signal in the proximity of a pipe joint;
   second casing collar locator means, disposed within said probe near said second end thereof and spaced from said first casing collar locator means by a measured, fixed distance, for generating a second joint-indicative signal in the proximity of a pipe joint;
   first electronic means, responsive to said first output signal, for generating a course length value representing the total distance travelled by said probe through said bore; and
   second electronic means, responsive to said first and second joint-indicative signals and to said first output signal for generating a distance error signal and applying said distance error signal to said first electronic means as a correction to said course length value.

19. The apparatus of claim 18, further comprising:
   third electronic means, responsive to said second electronic means and to the time interval between the generation of said first and second joint-indicative signals, for generating an acceleration error signal and applying said acceleration error signal to said accelerometric means as a correction to said first output signal.

20. The apparatus of claim 19, wherein said second electronic means comprises first computing means for calculating a computed distance value by twice integrating said first output signal with respect to time over the time interval between the generation of said first and second joint-indicative signals and for storing a measured distance value representing the measured fixed distance separating said first and second casing collar locator means; and wherein said third electronic means comprises second computing means for generating said acceleration error signal by calculating the difference between (a) a first acceleration value derived from said measured distance value and said time interval, and (b) a second acceleration value derived from said computed distance value and said time interval.

21. The apparatus of claim 18, wherein said first electronic means comprises:
   computing means for integrating said first output signal twice with respect to time from an initial time through successive, predefined periodic time intervals, to a current time interval.

22. The apparatus of claim 21, wherein said computing means comprises:
   first register means, responsive to said first output signal, for (a) storing the value of said first output signal, (b) incrementing the stored value of said first output signal continuously at periodic time intervals, and thereby (c) integrating said first output signal with respect to time through the current time interval to yield a value representative of the instantaneous velocity of said probe; and second register means, responsive to said instantaneous velocity value received from said first register means, for (a) storing said instantaneous velocity value, (b) incrementing the stored instantaneous velocity value continuously at said periodic time intervals, and thereby (c) integrating said instantaneous velocity value with respect to time through the current time interval to yield said course length value.

23. The apparatus of claim 18, wherein said second electronic means comprises:

computing means for (a) storing a measured distance value representing the measured fixed distance separating said first and second casing collar locator means, (b) calculating a computed distance value by twice integrating said first output signal with respect to time over the time interval between the generation of said first and second joint-indicative signals in response to the successive passage of one of said joints by said first and second casing collar locator means, and (c) comparing the computed distance value with the measured distance value to generate said distance error signal.

24. The apparatus of claim 23, wherein said computing means comprises:

first register means, responsive to said first output signal, for (a) storing the value of said first output signal, (b) incrementing the stored value of said first output signal continuously at periodic time intervals, and thereby (c) integrating said first output signal with respect to time through the current time interval to yield a value representative of the instantaneous velocity of said probe;

second, register means, responsive to said instantaneous velocity value received from said first register means, for (a) storing said instantaneous velocity value, (b) incrementing the stored instantaneous velocity value continuously at said periodic time intervals, and thereby (c) integrating said instantaneous velocity value with respect to time through the current time interval to yield said course length value; and third register means, responsive to said first and second joint-indicative signals and to said instantaneous velocity value received from said first register means, for (a) storing said instantaneous velocity value after first storing a zero value in response to said first joint-indicative signal, (b) incrementing the stored instantaneous velocity value continuously at said periodic time intervals until said second joint-indicative signal is generated, and thereby (c) integrating said instantaneous velocity value with respect to time during the interval between the generation of said first and second joint-indicative signals to yield said computed distance value.

25. The apparatus of claim 24, further comprising:

actuation means, operatively associated with said computing means, for sequentially (a) actuating said first casing collar locator means until said first joint-indicative signal is generated, (b) deactuating said first casing collar locator means and actuating said second casing collar locator means until said second joint-indicative signal is generated, and (c) deactuating said second casing collar locator means and reactuating said first casing collar locator means in response to said second joint-indicative signal.

26. Apparatus for measuring the course length of a well bore, wherein said bore includes a pipe formed from a plurality of pipe segments joined at spaced intervals by a pipe joint at each of said intervals, said apparatus comprising:

a probe having a hollow, elongate body defining a longitudinal axis, said body having first and second ends;

means for moving said probe in said pipe selectively either toward or away from the earth's surface;

accelerometric means in said probe for generating a first output signal having a value indicative of the rate of change of the velocity of said probe as said probe is moved through said pipe;

first casing collar locator means, disposed within said probe near said first end thereof, for generating a first joint-indicative signal in the proximity of a pipe joint;

second casing collar locator means, disposed within said probe near said second end thereof and spaced from said first casing collar locator means by a measured, fixed distance, for generating a second joint-indicative signal in the proximity of a pipe joint;

first electronic means, responsive to said first output signal, for generating a course length value representing the total distance travelled by said probe through said bore; and second electronic means, responsive to said first output signal and to said first and second joint-indicative signals, for generating an acceleration error signal and applying said acceleration error signal to said accelerometric means as a correction to said first output signal.

27. The apparatus of claim 26, wherein said second electronic means comprises:

computing means for (a) storing a measured distance value representing the measured fixed distance separating said first and second casing collar locator means, (b) calculating a computed distance value by twice integrating said first output signal with respect to time over the time interval between the generation of said first and second joint-indicative signals, and (c) generating said acceleration error signal by calculating the difference between (i) a first acceleration value derived from said measured distance value and said time interval, and (ii) a second acceleration value derived from said computed distance value and said time interval.

28. The apparatus of claim 27, wherein said computing means is a first computing means, and said second electronic means further comprises second computing means for (a) comparing said measured distance value with said computed distance value to generate a distance error signal, and (b) applying said distance error signal to said first electronic means as a correction to said course length value.

29. The apparatus of claim 28, further comprising:

actuation means, operatively associated with said second electronic means, for sequentially (a) actuating said first casing collar locator means until said first joint-indicative signal is generated, (b) deactuating said first casing collar locator means and actuating said second casing collar locator means until said second joint-indicative signal is generated, and (c) deactuating said second casing collar locator means and reactuating said first casing collar locator means in response to said second joint-indicative signal.

30. The apparatus of claim 26, further comprising third electronic means, responsive to said first output signal and to said first and second joint-indicative signals, for generating a distance error signal and applying said distance error signal to said first electronic means as a correction to said course length value.

* * * * *

UNITED STATES PATENT AND TRADEMARK OFFICE
CERTIFICATE OF CORRECTION

PATENT NO. : 4,662,209

DATED : May 5, 1987

INVENTOR(S) : Robert L. Brown

It is certified that error appears in the above-identified patent and that said Letters Patent are hereby corrected as shown below:

Column 2, line 47:
After "gravity-corrected", add --signal indicative of the time rate of change of velocity--.

Column 6, line 41:
After "analog", add --$\dot{v}$ signal as its input, produces a non-zero digital $\dot{v}$ signal--.

Column 9, line 62:
After "and", add --functionally equivalent substitutes will suggest themselves--.

Signed and Sealed this

Third Day of November, 1987

Attest:

DONALD J. QUIGG

Attesting Officer

Commissioner of Patents and Trademarks